United States Patent
Kiran et al.

(10) Patent No.: US 7,428,426 B2
(45) Date of Patent: Sep. 23, 2008

(54) METHOD AND APPARATUS FOR CONTROLLING TRANSMIT POWER IN A WIRELESS COMMUNICATIONS DEVICE

(75) Inventors: Kiran Kiran, La Jolla, CA (US); John Edward Smee, San Diego, CA (US)

(73) Assignee: QUALCOMM, Inc., San Diego, CA (US)

( * ) Notice: Subject to any disclaimer, the term of this patent is extended or adjusted under 35 U.S.C. 154(b) by 734 days.

(21) Appl. No.: 10/942,590

(22) Filed: Sep. 15, 2004

(65) Prior Publication Data

US 2006/0030352 A1 Feb. 9, 2006

Related U.S. Application Data

(60) Provisional application No. 60/599,390, filed on Aug. 6, 2004.

(51) Int. Cl.
*H04B 7/00* (2006.01)
(52) U.S. Cl. .................. 455/522; 370/318; 375/308
(58) Field of Classification Search ............. 455/63.1, 455/67.13, 126, 127.1, 127.2, 522, 69; 375/284–285, 375/261, 280, 281, 295–298, 308; 370/318
See application file for complete search history.

(56) References Cited

U.S. PATENT DOCUMENTS

| 6,529,560 | B1 * | 3/2003 | Creighton | 375/284 |
| 7,212,583 | B2 * | 5/2007 | Lindh | 375/296 |
| 2004/0208260 | A1 * | 10/2004 | Chan et al. | 375/297 |

FOREIGN PATENT DOCUMENTS

| DE | 19958658 | 6/2001 |
| GB | 2296165 | 6/1995 |

OTHER PUBLICATIONS

Lampe et al., "Reducing out-of-band Emissions due to Nonlinearities in OFDM Systems," Vehicular Technology Conference, IEEE, XP010342247, May 16, 1999.

* cited by examiner

*Primary Examiner*—Edward Urban
*Assistant Examiner*—Raymond S. Dean
(74) *Attorney, Agent, or Firm*—Amin, Turocy & Calvin, LLP (57) ABSTRACT

Systems and techniques for wireless communications are disclosed. The systems and techniques include the generation of a signal, the setting of an average transmit power of the signal transmission as a function of a first threshold relating to out-of-band emissions, the clipping of the signal as a function of a second threshold relating to peak transmit power, and the transmission of the signal over a wireless medium.

17 Claims, 5 Drawing Sheets

METHOD AND APPARATUS FOR CONTROLLING TRANSMIT POWER IN A WIRELESS COMMUNICATIONS DEVICE

CLAIM OF PRIORITY UNDER 35 U.S.C. §119

The present Application for Patent claims priority to Provisional Application No. 60/599,390 entitled "Method for Clipping peak Transmit Power while Limiting Out-of-Band Emissions in a Wireless Communications System" filed Aug. 6, 2004, and assigned to the assignee hereof and hereby expressly incorporated by reference herein.

BACKGROUND

Field

The present disclosure relates generally to wireless communications, and more particular, to systems and methods for controlling the transmit power in a wireless communications device.

Wireless communication systems are designed to allow multiple users to share a common communications medium. Numerous multiple-access techniques are known in the art such as Code Division Multiple Access (CDMA), time division multiple access, frequency division multiple access, as well as many other similar multi-access techniques. The multi-access concept is based on channel allocations that separate communications among multiple users. By way of example, in CDMA communication systems, channel separation may be achieved by transmitting each signal with a different code that modulates a carrier, and thereby, spreads the signal over the entire frequency spectrum. The transmitted signals can be separated in the receiver by a demodulator using a corresponding code to de-spread the desired signal. The undesired signals, whose codes do not match, contribute only to noise.

The ability of a receiver to separate the transmitted signal from the noise may be measured by the Signal-to-Noise Ratio (SNR). The average signal transmission power may be controlled at the transmitter to achieve a specific SNR at the receiver in accordance with the quality of service requirements. Typically, a higher SNR is required to achieve a higher data rate that might be required for a video or other high bandwidth transmission. A higher SNR may also be required if the transmitter is far away from the receiver. In either case, improvements in the SNR may be achieved by increasing the average signal transmit power at the transmitter. Unfortunately, this increase may result in signal power peaks that exceed regulatory limits, such as those imposed by the Federal Communications Commission in the United States. This may occur in CDMA communication systems where each user simultaneously transmits over the same frequency spectrum. Multilevel modulation and transmit pulse shape filtering further increase the probability that the peak transmit power may exceed the regulatory limits.

One way to increase the average transmit power while maintaining the peak transmit within the regulatory limits is to clip the signal when the instantaneous transmit power is above a certain threshold. However, clipping a signal can significantly increase the out-of band emissions, as well as introduce distortion in the signal. Out-of-band emissions are also regulated, and therefore, may significantly limit the use of clipping to reduce peaks in the signal power.

Accordingly, there is a need in the art for optimizing the average transmit power to maintain a desired quality of service, and still meet the regulatory limits for both peak transmit power and out-of-band emissions.

SUMMARY

In one aspect of the present invention, a method of wireless communications includes generating a signal, setting an average transmit power of the signal transmission as a function of a first threshold relating to out-of-band emissions, clipping the signal as a function of a first threshold relating to peak transmit power, and transmitting the signal over a wireless medium.

In another aspect of the present invention, a wireless communications device includes a user interface configured to generate a signal, a power control module configured to set an average transmit power of the transmitter as a function of a first threshold relating to out-of-band emissions, a peak amplitude limiter configured to clip the signal as a function of a second threshold relating to peak transmit power, and a transmitter configured to transmit the signal over a wireless medium.

In yet another aspect of the present invention, a wireless communications device includes means for generating a signal, means for setting an average transmit power of the signal transmission as a function of a first threshold relating to out-of-band emissions resulting from the clipping of the signal, means for clipping the signal as a function of a second threshold relating to peak transmit power, and means for transmitting the signal over a wireless medium.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

In the following detailed description, various power control techniques may be described in the context of a CDMA wireless communications device. While these power control techniques may be well suited for use in this application, those skilled in the art will readily appreciate that these inventive aspects are likewise applicable in various other communication and/or electronic devices. Accordingly, any reference to a CDMA wireless communications device is intended only to illustrate the inventive aspects, with the understanding that such inventive aspects have a wide range of applications.

Figure 1:
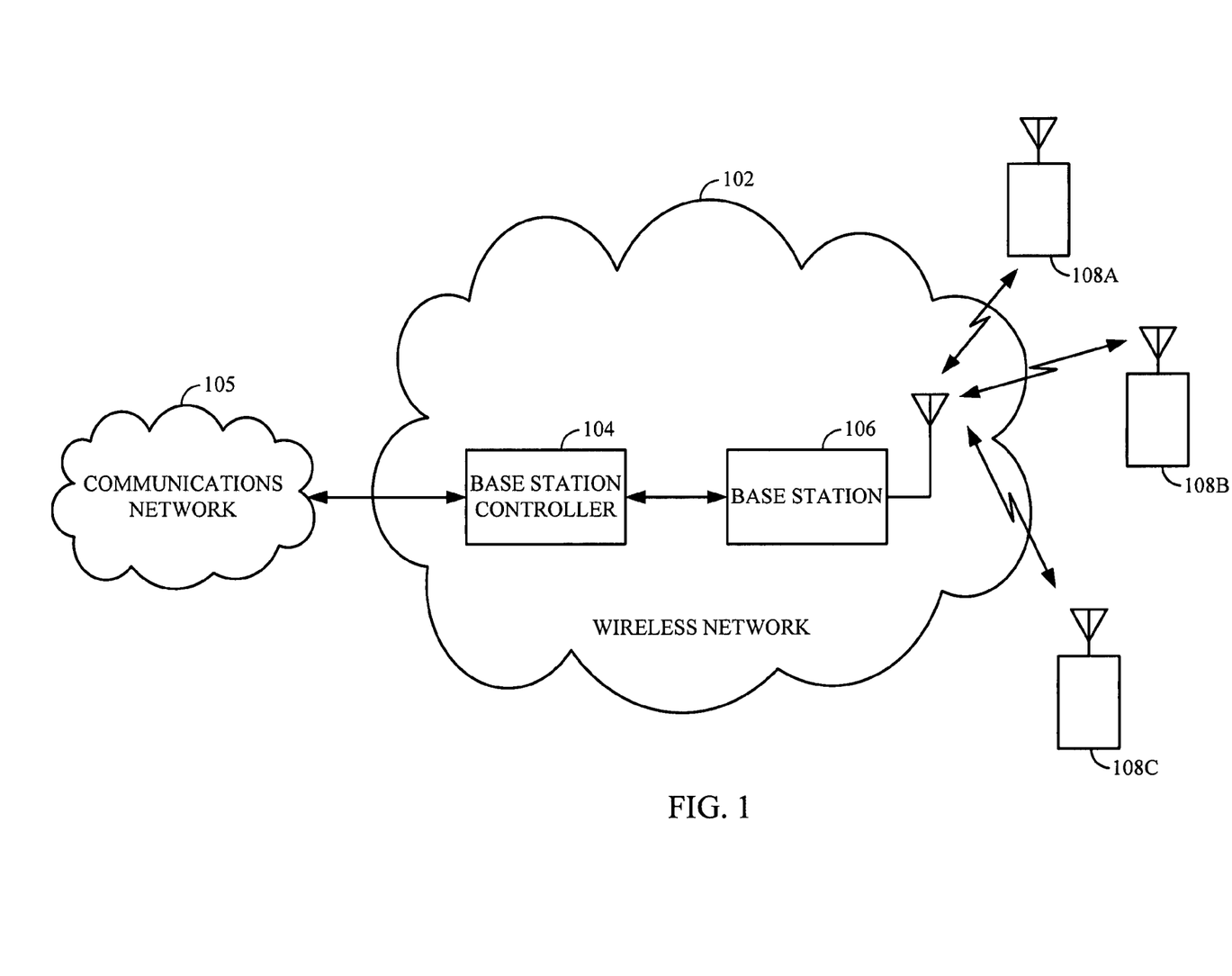
FIG. 1 is a conceptual block diagram illustrating an example of a variable data rate CDMA communications system.

FIG. 1 is a conceptual block diagram illustrating an example of a CDMA communications system employing a variable data rate request scheme. The CDMA communications system may include a wireless network 102 having a base station controller (BSC) 104. The BSC 104 may be used to interface the wireless network 102 to a communications network 105. The communications network 105 may be a packet-based network, such as the Internet, a corporate intranet, or the like. Alternatively, the communications network 105 may be a circuit-switched network, such as a public switched telephone network (PSTN). The wireless network 102 may be implemented with any number of base stations dispersed throughout a geographic region. The geographic region may be subdivided into smaller regions known as cells with a base station serving each cell. For simplicity, one base station 106 is shown serving an entire sector under control of the BSC 104. Three subscriber stations 108a-c are shown in communication with the base station 106. Each subscriber station 108a-c may access the communications network 105, or communicate with other subscriber stations, through one or more base stations.

In the illustrative CDMA communications system, the forward and reverse link data rates may be controlled to optimize system capacity by means well known in the art. The "forward link" refers to transmissions from the base station 106 to a subscriber station 108, and the "reverse link" refers to transmissions from a subscriber station 108 to the base station 106. For the purposes of illustration, the various inventive concepts will be described with reference to the reverse link, with the understanding that such inventive concepts are equally applicable to the forward link as well.

In the reverse link, the base station 106 may determine the data rate for reverse link communications with each subscriber station in its cell. The data rate selected by the base station 106 may be based on the type of communications supported, or any other criteria. By way of example, the base station may determine that a high data rate is required for communications encompassing a video application. Conversely, the base station 106 may select a lower data rate for voice communications. Other factors may also weigh in on the decision by the base station to assign a particular data rate to the subscriber station 108. By way of example, a fairness criteria that considers the amount of information to be transmitted by the subscriber station 108 and the delay already experienced by the subscriber station 108 may be considered. In any event, the data rate selected by the base station 106 may be embedded in the forward link transmission to the subscriber station 108.

A power control system may be employed to reduce mutual interference between multiple subscriber stations operating in the same cell. The average reverse link transmission power is typically controlled by two power control loops. The first power control loop is an open loop control. The open loop control is designed to control the average reverse link transmission power as a function of the path loss, the effect of the base station loading, and environmentally induced phenomena such as fast fading and shadowing. The second power control loop is a closed loop control. The closed loop control has the function of correcting the open loop control to achieve a desired SNR and frame error rate (FER) at the base station. This may be achieved by measuring the average power of the reverse link transmission at the base station 106 and providing feedback to the subscriber station 108 to adjust the average transmit power of the reverse link. Both the open and closed loop controls are well known in CDMA communication systems.

In the illustrative embodiment of the CDMA communications system described thus far, the reverse link peak transmit power measured over some period of time may be significantly above the average power measured over a longer period of time. The relation between the two may be defined by a Peak-to-Average Ratio (PAR). If the power control system is used to limit the peak transmit power in accordance with the regulatory limits, or any other system requirement, a critical PAR may be determined that defines the maximum average transmit power to meet the out-of-band emission requirements. By way of example, if the system requirements impose a peak transmit power of 20 Watts (W), and a critical PAR for the subscriber station is determined to be 10 times above the average transmit power, then the average transmit power would need to be limited to 2 W to meet the out-of-band emission requirements. If the average transmit power were to exceed 2 W, the out-of-band emission requirements may not be met.

The critical PAR may be determined based on the system requirements on peak transmit power and out-of-band emissions, and on one or more parameters relating to the processing of the signal. The one or more parameters may include the transmit filter characteristics, the signal data rate, and/or the modulation scheme. The critical PAR may be determined through an off-line calibration procedure. The calibration procedure may be performed in a variety of ways. By way of example, a limiter may be used to clip the signal when it exceeds the peak power while the average transmit power may be increased slowly from a minimum value to a maximum value. The average transmit power may be controlled by simulating feedback from a base station for the power control loop. During the calibration procedure, the out-of-band emissions may be monitored with any standard test equipment. The average transmit power that causes the out-of-band emissions to reach the limit imposed by the system requirements is recorded. The critical PAR may then be computed from the system requirements on peak transmit power and the average transmit power recorded during the calibration procedure. In a manner to be described in greater detail later, the critical PAR may be stored in the subscriber station and used during operation to limit the average transmit power.

In CDMA communication systems with variable transmission formats, a critical PAR may be computed for each transmission format during the calibration procedure. Each transmission format may include a data rate, a modulation scheme, an encoding scheme and a payload size. In one embodiment of the CDMA communications system, each transmission format can be identified by its data rate, with each data rate having a fixed encoding and modulation scheme, as well as a fixed payload size. In this embodiment, the results of the calibration procedure can be recorded as shown below in Table 1.

TABLE 1

| Data rate (kbps) | Critical PAR (dB) |
|---|---|
| 0 | 8.55 |
| 19.2 | 6.88 |
| 38.4 | 6.03 |
| 76.8 | 5.17 |
| 115.2 | 4.81 |
| 153.6 | 4.55 |
| 230.4 | 4.43 |
| 307.2 | 4.34 |
| 460.8 | 5.63 |
| 614.4 | 5.48 |
| 921.6 | 6.53 |
| 1228.8 | 6.36 |

Table 1 shows the critical PAR at each data rate. This table may be stored in the subscriber station 108 and used during operation to limit the average transmit power of the subscriber station. This allows a different average transmit power level for each data rate such that the highest possible average transmit power can always be used.

Figure 2:
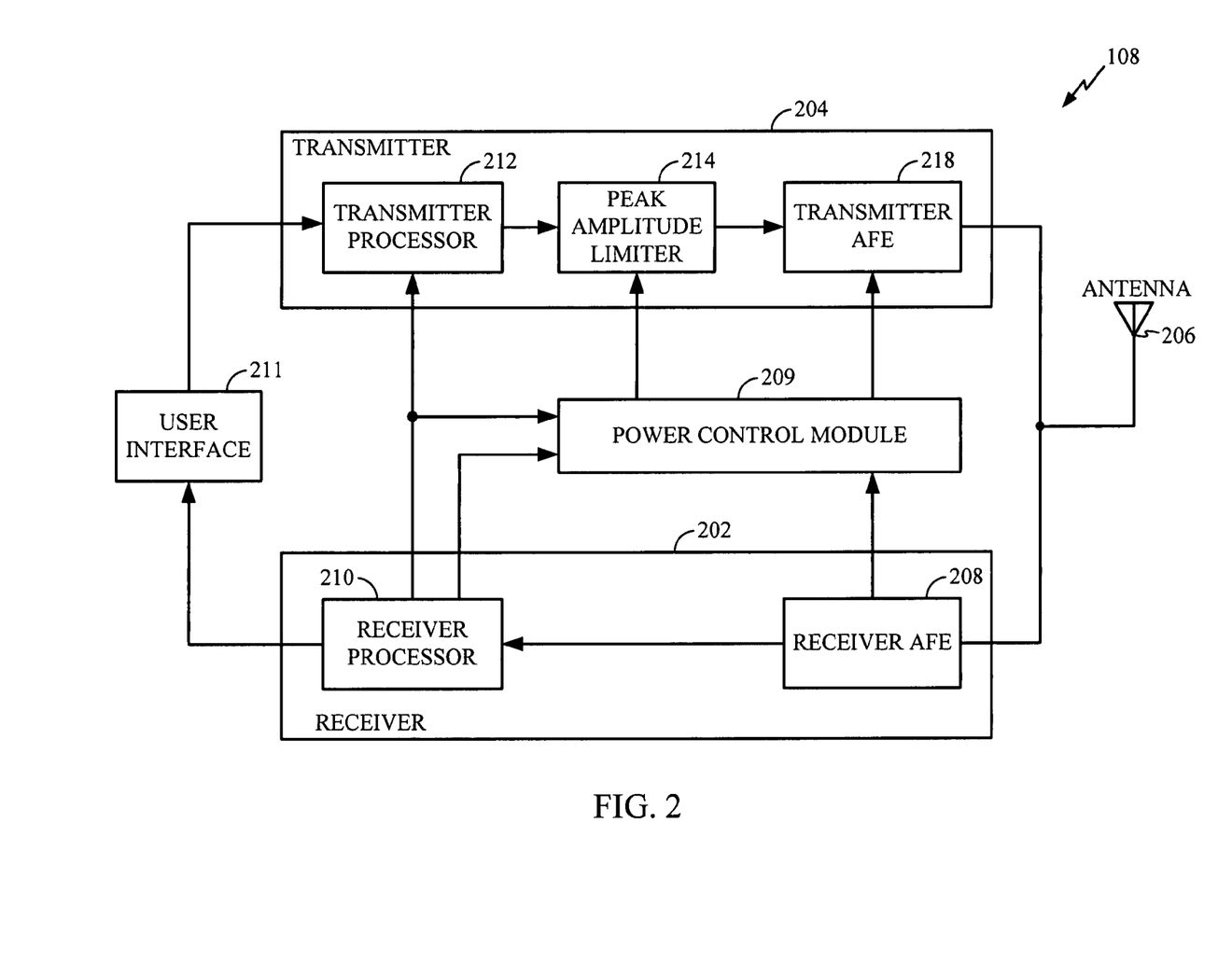
FIG. 2 is a functional block diagram illustrating an example of a subscriber station for use in a variable data rate CDMA communications system.

FIG. 2 is a functional block diagram illustrating an example of a subscriber station for use in a variable data rate CDMA communications system. The subscriber station 108 may include a receiver 202 and transmitter 204 coupled to an antenna 206. A power control module 209 may be used to control both the peak and average power of the transmitter 204.

The receiver 202 may include a receiver analog front end (AFE) 208 and a receiver processor 210. The receiver AFE 208 may be used to amplify, filter and downconvert the radio frequency (RF) signal received from the antenna 206 to a digital baseband signal. The receiver AFE 208 may also provide a receiver signal strength indicator (RSSI) signal to the power control module 209 to compute the path loss between the base station and the subscriber station for open loop control computations.

The digital baseband signal generated by the receiver AFE 208 may be provided to the receiver processor 210. The receiver processor 210 may be used to convert the digital baseband signal to information needed to drive various user interfaces 211, such as a display, ringer, vibrator, audio speaker, and/or the like. The conversion of the digital baseband signal to this type of information may include various signal processing functions including demodulation, forward error correction, and spread spectrum processing.

The digital baseband signal may also include a number of control signals. One such control signal is the feedback from the base station indicating whether to increase or decrease the average transmit power of reverse link at the base station. This feedback may be extracted by the receiver processor 210 and provided to the power control module 209 for closed loop control computations. Another control signal included in the digital baseband signal may be a command directing the subscriber station to operate at a specific data rate. The receiver processor 210 may be used to extract this command and provide it to the transmitter 204.

The transmitter 204 may include a transmitter processor 212. The transmitter processor 212 may use the data rate command from the receiver processor 210 to control the data rate of a digital baseband signal generated from the information received from the various user interfaces, such as a keypad, touchpad, mouse, joystick, audio microphone, digital camera, and/or the like. The transmitter processor 212 may also provide various signal processing functions such as coding for forward error correction at the base station, modulation, and spread spectrum processing.

A peak amplitude limiter 214 may be used to limit the peak transmit power, which may be required, by way of example, to comply with the regulatory limits. As will be described in greater detail later, the peak amplitude limiter 214 may implement a clipping algorithm on the digital baseband signal to limit the peak transmit power based on inputs it receives from the power control module 209. Although the peak amplitude limiter 214 is shown as a separate entity in the transmitter 204, those skilled in the art will readily appreciate that the peak amplitude limiter 214 may be part of the transmitter processor 212, or any other entity in the subscriber station. Alternatively, the peak amplitude limiter 214 may be implemented in the analog domain as part of a transmitter AFE 218.

In the embodiment of the subscriber station shown in FIG. 2, the power limited signal from the peak amplitude limiter 214 may be provided to the transmitter AFE 218. The transmitter AFE 218 may be used to upconvert the digital baseband signal to an RF signal, as well as provide filtering and amplification. A gain control signal generated by the power control module 209 may be used to control the amplifiers in the transmitter AFE 218. In a manner to be described in greater detail later, the gain control signal may be generated from the open and closed power control loops, and limited to the highest level for which the out-of-band emissions and distortion resulting from clipping the signal satisfy the system requirements.

Figure 3:
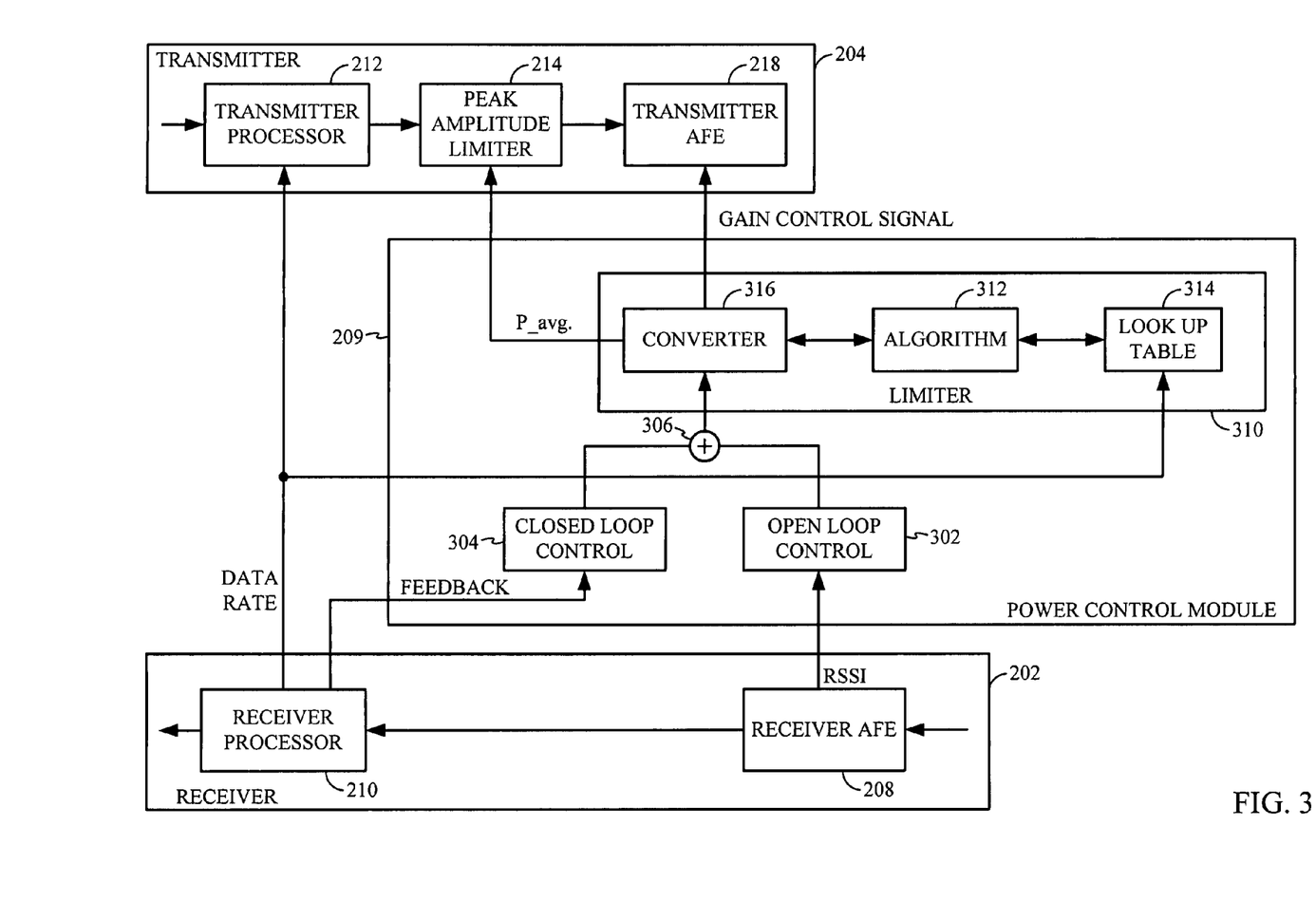
FIG. 3 is a functional block diagram illustrating an example of a power control module for use in a subscriber station operating in a variable data rate CDMA communications system.

FIG. 3 is a functional block diagram illustrating an example of a power control module for use in a subscriber station operating in a variable rate CDMA communications system. Although the power control module 209 is shown as a separate entity in the subscriber station 108, those skilled in the art will readily appreciate that the power control module 209 may be implemented in the transmitter 204, the receiver 202, or anywhere else in the subscriber station 108. The power control module 209 may be implemented as hardware, software, firmware, or any combination thereof. By way of example, the power control module 204 may be implemented as power control software running on a microprocessor. The microprocessor may be separate from the transmitter 204 and the receiver 202, and dedicated to running the power control software. Alternatively, the power control software may be run by an existing microprocessor in the transmitter 204, the receiver 202, or anywhere else in the subscriber station 108.

The power control module 209 may include two power control loops. An open loop control 302 may be used to generate an estimate of the required average transmission power based on the average value of the RSSI signal from the receiver AFE 208 by means well known in the art. A closed loop control 304 may be to generate a close loop estimate from the feedback it receives from the base station via the receiver processor 210, also by means well known in the art. The closed loop estimate may be used to increment or decrement the current open loop estimate. This may be achieved by summing the closed loop estimate with the open loop estimate using a summer 306. The sum of the closed and open loop estimates yields a gain control signal representative of the average reverse link power called for by the base station.

The gain control signal produced by the summer 306 may be provided to a limiter 310 before being applied to the transmitter AFE 218. The limiter 310 may be used to ensure that the average transmit power does not cause the out-of-band emission and distortion to exceed the system requirements. This may be achieved with an algorithm 312 that determines the maximum average transmit power from the critical PAR for the data rate and modulation scheme employed by the subscriber station. The critical PAR may be obtained from a look up table 314 that maps the data rate and modulation scheme to a critical PAR, such as Table 1 presented earlier for a variable data rate subscriber station with a specific modulation scheme for each data rate.

A converter 316 may be used to convert the gain control signal produced by the summer 306 to an average transmit power (P_avg) in dB. The average transmit power P_avg represents the conducted transmission power and is related to the radiated transmission power according to the antenna gain. The converter 316 may be a look up table generated during subscriber station calibration.

The algorithm 312 may be used to ensure that the average transmit power P_avg generated from the gain control signal satisfies the following equation:

$$P\_avg < P\_max - \text{Critical PAR} \tag{1}$$

where P_max represents the system requirements for peak transmit power. By way of example, the peak transmit power P_max may be set to the regulatory limits. The peak transmit power P_max may be programmed into the limiter 310, or provided to it from an external memory in the subscriber station.

In the event that the average transmit power P_avg does not satisfy equation (1), then the algorithm 312 may decrease the average transmit power P_avg to the limit defined by the peak transmit power P_max minus the Critical PAR. This is the maximum average transmit power for which the out-of-band emissions and distortion resulting from clipping the signal will satisfy the system requirements. The average transmit power P_avg set by the algorithm 312 may be routed back to the converter 316 for mapping to a gain control signal before being provided to the transmitter AFE 218.

The average transmit power P_avg generated by the converter 316 from the gain control signal may also be provided to the peak amplitude limiter 214 in the transmitter. The peak amplitude limiter 214 may be used to measure the average root-mean-square (RMS) envelope power of the digital baseband signal over a window of time and scale the complex envelope when it exceeds the equivalent of P_max.

Figure 4:
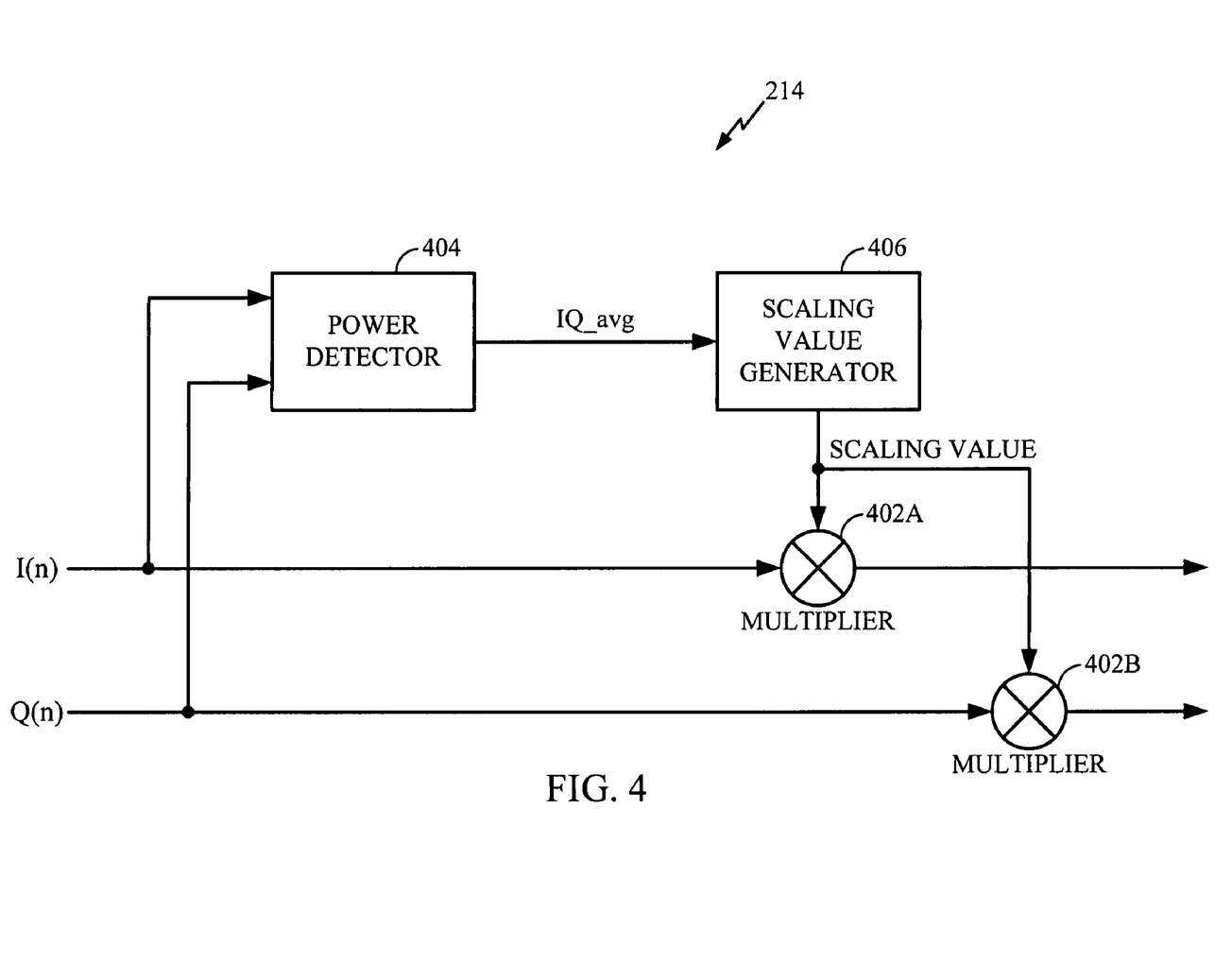
FIG. 4 is a functional block diagram illustrating one embodiment of a peak amplitude limiter for use in a subscriber station operating in a variable data rate CDMA communications system.

FIG. 4 is a functional block diagram illustrating one embodiment of a peak amplitude limiter for use in a transmitter operating in a variable data rate subscriber station. The peak amplitude limiter 214 may be configured to receive the digital baseband signal from the transmitter processor 212. The digital baseband signal may comprise a series of digital samples, with each sample having an in-phase component I(n) and a quadrature component Q(n). A pair of multipliers 402a and 402b may be used to scale the I and Q components of the digital samples. The scaled digital samples may be output from the peak amplitude limiter 214 and provided to the transmitter AFE 218 for digitization, filtering, amplification and upconversion to a RF signal.

The scaling values input to the multipliers 402a and 402b may be generated by a power detector 404 and a scaling value generator 406. The power detector 404 may be used to measure the average envelope power of the digital baseband signal over a window of time using the following equation:

$$IQ\_avg = \left(\frac{1}{N} \sum_{i=n-N+1}^{n} (I^2[i] + Q^2[i])\right)^{0.5} \tag{2}$$

where N is the number of digital samples in the window of time.

The average envelope power of the digital baseband signal (IQ_avg) may be provided to the scaling value generator 406. The scaling value generator 406 may be used to determine whether the average envelope power of digital baseband signal exceeds the equivalent of P_max. In the event that the average envelope power of digital baseband signal does not exceed the equivalent of P_max, then the scaling value generator 406 provides a "1" to the multipliers 402a and 402b. If, on the other hand, the average envelope power of the digital baseband signal exceeds the equivalent of P_max, then the scaling value generator 406 may provide a scaling value to the multipliers 402a and 402b to clip the signal. The scaling value generator 406 may be implemented with the following formula:

$$\text{amp\_scale} = \max\left(\sqrt{\frac{P\_avg}{P\_max}} \frac{(I^2[n] + Q^2[n])^{0.5}}{IQ\_avg}, 1\right) \tag{3}$$

The scaling value output from the scaling value generator 406 and provided to the multipliers 402a and 402b may be defined as follows:

$$1/\text{amp\_scale} \tag{4}$$

Figure 5:
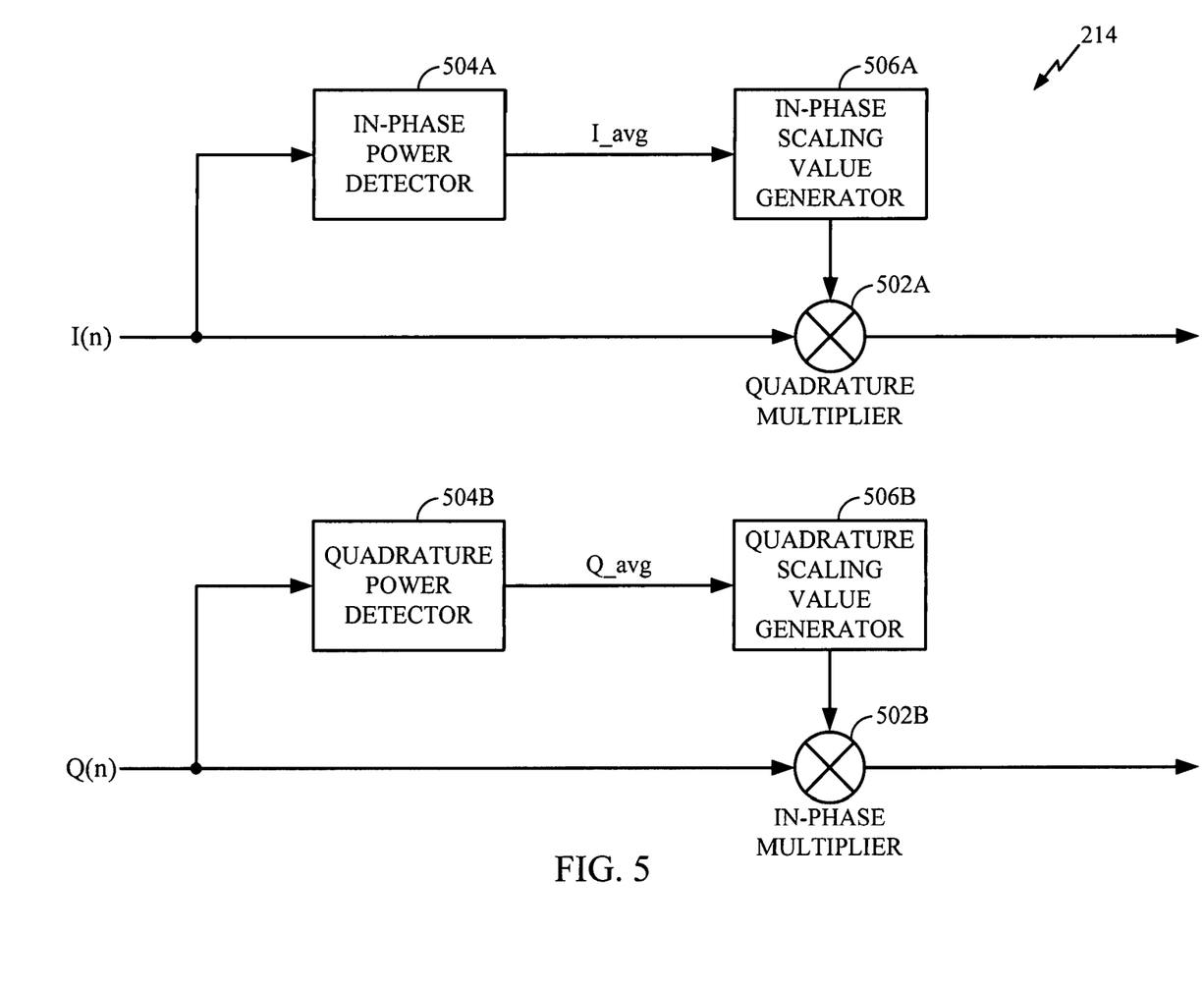
FIG. 5 is functional block diagram illustrating another embodiment of a peak amplitude limiter for use in a subscriber station operating in a variable data rate CDMA communications system.

FIG. 5 is a functional block diagram illustrating another embodiment of a peak amplitude limiter for use in a transmitter operating in a variable data rate subscriber station. Similar to the embodiment described in connection with FIG. 4, the peak amplitude limiter 214 may be configured to receive the digital baseband signal from the transmitter processor 212 comprising a series of digital samples, with each sample having an in-phase component I(n) and a quadrature component Q(n). However, in this case, the I and Q components of the digital samples may be scaled independently of one another. An in-phase multiplier 502a may be used to scale I component, and a quadrature multiplier 502b may be used to scale the Q component. The individually scaled digital samples may be output from the peak amplitude limiter 214 and provided to the transmitter AFE 218 for digitization, filtering, amplification and upconversion to a RF signal.

The scaling value input to the in-phase multiplier 502a may be generated by an in-phase power detector 504a and an in-phase scaling value generator 506a. The scaling value input to the quadrature multiplier 502b may be generated by a quadrature power detector 504b and a quadrature scaling value generator 506b. The power detectors 504a and 504b operate independently of one another, as do the scaling value generators 506a and 506b.

The in-phase power detector 504a may be used to measure the average envelope power of the I component of digital baseband signal using the following equation:

$$I\_avg = \frac{1}{\sqrt{2}} \left(\frac{1}{N} \sum_{i=n-N+1}^{n} I^2[i]\right)^{0.5} \tag{5}$$

The average envelope power of the I component of the digital baseband signal (I_avg) may be provided to the in-phase scaling value generator 506a. The in-phase scaling value generator 506a may be used to determine whether the average envelope power of the I component of the digital baseband signal exceeds the equivalent of P_max. In the event that the average envelope power of the I component of the digital baseband signal does not exceed the equivalent of P_max, then the in-phase scaling value generator 506a provides a "1" to the in-phase multiplier 502a. If, on the other hand, the average envelope power of the I component of the digital baseband signal exceeds the equivalent of P_max, then the in-phase scaling value generator 506a may provide a scaling value to the in-phase multiplier 502a to clip the I component of the signal. The in-phase scaling value generator 506a may be implemented with the following formula:

$$I\_amp\_scale = \max\left(\sqrt{\frac{P\_avg}{P\_max}} \frac{I[n]}{I\_avg}, 1\right) \quad (6)$$

The scaling value output from the in-phase scaling value generator 506a and provided to the in-phase multiplier 502a may be defined as follows:

$$1/I\_amp\_scale \quad (7)$$

The quadrature power detector 504b may be used to measure the average envelope power of the Q component of digital baseband signal using the following equation:

$$Q\_avg = \frac{1}{\sqrt{2}} \left(\frac{1}{N} \sum_{i=n-N+1}^{n} Q^2[i]\right)^{0.5} \quad (8)$$

The average envelope power of the Q component of the digital baseband signal (Q_avg) may be provided to the quadrature scaling value generator 506b. The quadrature scaling value generator 506b may be used to determine whether the average envelope power of the Q component of the digital baseband signal exceeds the equivalent of P_max. In the event that the average envelope power of the Q component of the digital baseband signal does not exceed the equivalent of P_max, then the quadrature scaling value generator 506b provides a "1" to the quadrature multiplier 502b. If, on the other hand, the average envelope power of the Q component of the digital baseband signal exceeds the equivalent of P_max, then the quadrature scaling value generator 506b may provide a scaling value to the quadrature phase multiplier 502b to clip the Q component of the signal. The quadrature scaling value generator 506b may be implemented with the following formula:

$$Q\_amp\_scale = \max\left(\sqrt{\frac{P\_avg}{P\_max}} \frac{Q[n]}{Q\_avg}, 1\right) \quad (9)$$

The scaling value output from the quadrature scaling value generator 506b and provided to the quadrature multiplier 502b may be defined as follows:

$$1/Q\_amp\_scale \quad (10)$$

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
   generating a signal, the signal comprising an in-phase (I) component and a quadrature (Q) component;
   setting an average transmit power of the signal as a function of a first threshold relating to out-of-band emissions;
   determining that an average envelope power of the signal is above a second threshold relating to peak transmit power, wherein the average envelope power of the signal is determined independently for each of the I and Q components;
   scaling the Q component if the Q average envelope power is above the second threshold; scaling the I component if the I average envelope power is above the second threshold;
   clipping the signal as a function of the second threshold; and
   transmitting the signal over a wireless medium.

2. The method of claim 1 wherein the average transmit power of the signal transmission is set to the highest level for which the out-of-band emissions does not exceed the first threshold.

3. The method of claim 2 wherein the average transmit power of the signal transmission is set based on a parameter relating to the signal.

4. The method of claim 3 wherein the parameter comprises at least one of a signal data rate, a signal modulation scheme, a signal encoding scheme and a signal payload size.

5. The method of claim 3 further comprising consulting a look up table that maps the parameter to a peak-to-average power ratio, and wherein the average transmit power of the signal transmission is set as a function of the peak-to-average power ratio and the second threshold.

6. The method of claim 5 wherein the average transmit power of the signal transmission is set by generating a gain control signal independently of the parameter, and limiting the gain control signal as a function of the peak-to-average power ratio and the second threshold, and wherein the signal is transmitted by applying the limited gain control signal to a transmitter.

7. The method of claim 6 wherein the gain control signal generated independently of the parameter is a function of feedback from a remote source indicating the quality of the wireless medium.

8. The method of claim 6 wherein the gain control signal generated independently of the parameter is a function of the power of a signal received from a remote source over the wireless medium.

9. A wireless communications device, comprising:
a user interface configured to generate a signal, the signal comprising an in-phase (I) component and a quadrature (Q) component;
a transmitter configured to transmit the signal over a wireless medium;
a power control module configured to set an average transmit power of the transmitter as a function of a first threshold relating to out-of band emissions;
a quadrature power detector for measuring an average envelope power of the Q component;
an in-phase power detector for measuring an average envelope power of the I component;
a quadrature scaling value generator for generating a scaling value for the Q component based on whether or not the Q average envelope power exceeds a second threshold relating to peak transmit power;
an in-phase scaling value generator for generating a scaling value for the I component based on whether or not the I average envelope power exceeds the second threshold;
a quadrature multiplier for multiplying the Q component by the Q scaling factor;
an in-phase multiplier for multiplying the I component by the I scaling factor;
a peak amplitude limiter configured to clip the signal as a function of the second threshold.

10. The wireless communications device of claim 9 wherein the power control module is further configured to set the average transmit power of the transmitter to the highest level for which the out-of-band emissions does not exceed the first threshold.

11. The wireless communications device of claim 10 wherein the power control module is further configured to set the average transmit power of the transmitter based on a parameter relating to the signal.

12. The wireless communications device of claim 11 wherein the parameter comprises at least one of a signal data rate, a signal modulation scheme, a signal encoding scheme, and a signal payload size.

13. The wireless communications device of claim 11 further comprising a look up table that maps the parameter to a peak-to-average power ratio, and wherein the power control module is further configured to consult the look up table to access the peak-to average power ratio for the parameter and set the average transmit power of the transmitter as a function of the peak-to-average power ratio and the second threshold.

14. The wireless communications device of claim 13 wherein the power control module is further configured to generate a gain control signal independently of the parameter, limit the gain control signal as a function of the peak-to-average power ratio and the second threshold, and apply the limited gain control signal to the transmitter to set the average transmit power.

15. The wireless communications device of claim 14 further comprising a receiver configured to extract feedback from a signal received from a remote source indicating the quality of the wireless medium, and wherein the power control module is further configured to generate the gain control signal as a function of the feedback.

16. The wireless communications device of claim 14 further comprising a receiver configured to receive a signal from a remote source and measure the power of the received signal, and wherein the power control module is further configured to generate the gain control signal as a function the measured power of the received signal.

17. A wireless communications device, comprising:
means for generating a signal, the signal comprising an in-phase (I) component and a quadrature (Q) component;
means for transmitting the signal over a wireless medium;
means for setting an average transmit power of the signal transmission as a function of a first threshold relating to out-of-band emissions;
means for determining that an average envelope power of the signal is above a second threshold relating to peak transmit power, wherein the average envelope power of the signal is determined independently for each of the I and Q components;
means for scaling the Q component if the Q average envelope power is above the second threshold; means for scaling the I component if the I average envelope power is above the second threshold;
means for clipping the signal as a function of the second threshold.

* * * * *